(12) United States Patent
Yoo

(10) Patent No.: US 10,322,468 B2
(45) Date of Patent: Jun. 18, 2019

(54) APPARATUS FOR PROCESSING MICRO-COMPONENT BY USING LASER

(71) Applicant: T.FRIENDS CO., LTD., Incheon (KR)

(72) Inventor: Su Young Yoo, Incheon (KR)

(73) Assignee: T.FRIENDS CO., LTD., Incheon (KR)

( * ) Notice: Subject to any disclaimer, the term of this patent is extended or adjusted under 35 U.S.C. 154(b) by 419 days.

(21) Appl. No.: 15/300,073

(22) PCT Filed: Feb. 24, 2015

(86) PCT No.: PCT/KR2015/001774
§ 371 (c)(1),
(2) Date: Sep. 28, 2016

(87) PCT Pub. No.: WO2016/085046
PCT Pub. Date: Jun. 2, 2016

(65) Prior Publication Data
US 2017/0120378 A1 May 4, 2017

(30) Foreign Application Priority Data
Nov. 25, 2014 (KR) ........................ 10-2014-0165313

(51) Int. Cl.
| *B23K 26/06* | (2014.01) |
| *B23K 26/384* | (2014.01) |
| *B23K 26/082* | (2014.01) |
| *F02M 61/18* | (2006.01) |
| *F02M 61/16* | (2006.01) |
| *B23K 101/00* | (2006.01) |

(52) U.S. Cl.
CPC ...... *B23K 26/0652* (2013.01); *B23K 26/0648* (2013.01); *B23K 26/082* (2015.10); *B23K 26/384* (2015.10); *B23K 2101/006* (2018.08); *F02M 61/168* (2013.01); *F02M 61/1806* (2013.01); *F02M 2200/8069* (2013.01)

(58) Field of Classification Search
CPC .............................. B23K 26/06; B23K 26/384
USPC ........................................ 219/121.67–121.73
See application file for complete search history.

(56) References Cited

U.S. PATENT DOCUMENTS

| 6,635,849 B1 * | 10/2003 | Okawa | ................. | B23K 26/043 |
| | | | | 219/121.7 |
| 8,214,010 B2 * | 7/2012 | Courtney | ............. | A61B 5/0062 |
| | | | | 600/407 |

FOREIGN PATENT DOCUMENTS

| JP | 2000271772 | 10/2000 |
| JP | 2005262251 | 9/2005 |
| KR | 20140028196 | 3/2014 |

* cited by examiner

*Primary Examiner* — Samuel M Heinrich
(74) *Attorney, Agent, or Firm* — IPLA P.A.; James E. Bame

(57) ABSTRACT

An apparatus for processing a micro-component by using laser which defines a hole by using laser irradiated to a surface of an object to be processed, the apparatus includes a laser irradiation part irradiating the laser, an optical axis horizontal movement part horizontally moving an optical axis of the laser irradiated from the laser irradiation part, an optical axis angle adjustment part adjusting an angle of the optical axis of the laser horizontally moved by the optical axis horizontal movement part, a reflection part reflecting the laser of which the angle of the optical axis is adjusted by the optical axis angle adjustment part, and a light collecting lens collecting the laser reflected by the reflection part on the surface of the object to be processed.

8 Claims, 2 Drawing Sheets

[Fig. 1]
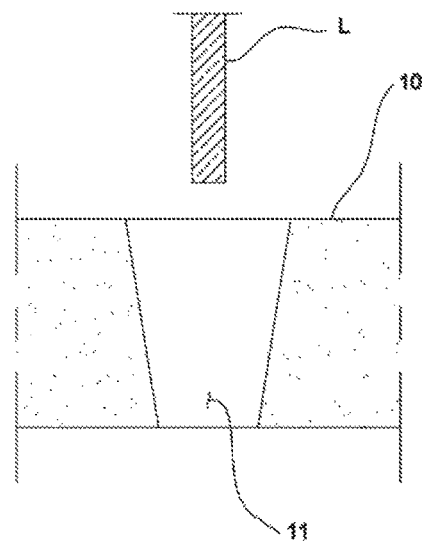
[Fig. 2]
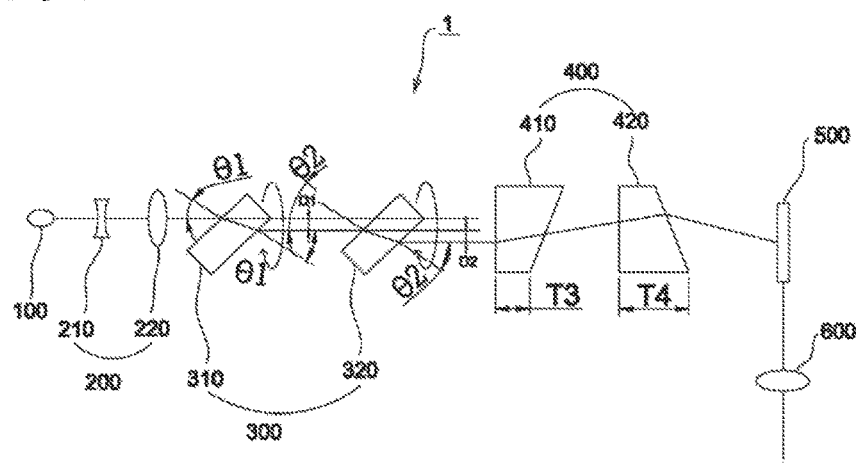
[Fig. 3]
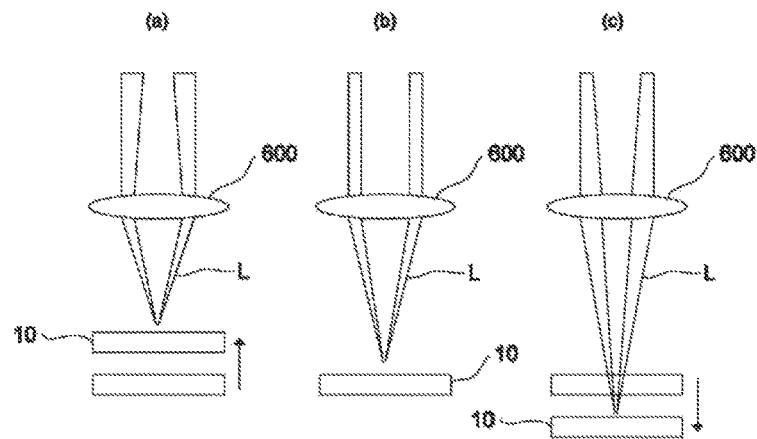

[Fig. 4]
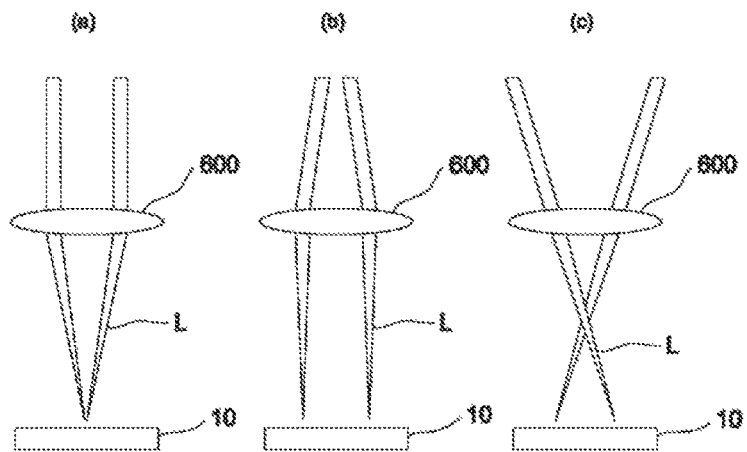
[Fig. 5]
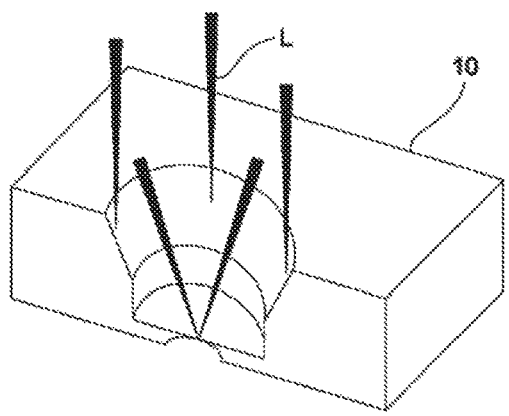
[Fig. 6]
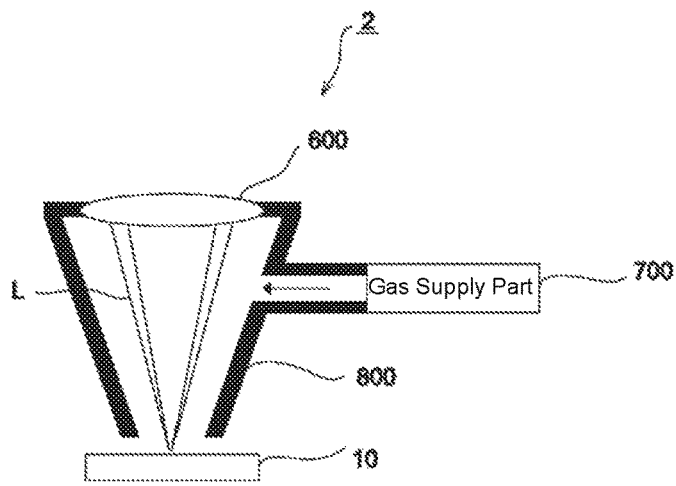

APPARATUS FOR PROCESSING MICRO-COMPONENT BY USING LASER

BACKGROUND

The present invention relates to an apparatus for processing a micro-component by using laser.

In recent years, as a micro-processing industry is magnified, an apparatus for manufacturing a micro-component for micro-processing has been developed. In case of remote procedure processing equipment capable of incising only an extremely narrow area and then reproducing a complex doctor's hand operation to minimize burden of a patient and a medical device such as endoscopy equipment that inserts an endoscope to which a tiny camera that may watch an operation situation is mounted into the patient body for incision or suturing, super-precision processing is required in consideration of a size of the component. For another example, in case of an automobile component such as a fuel injection nozzle having an extremely narrow diameter and a specific shape to maximize efficiency and minimize noise of a diesel engine, the precision processing for various shaped nozzle holes is necessary.

FIG. 1 is a conceptual cross-sectional view illustrating a process of defining a hole by the apparatus for processing a micro-component by using laser according to a related art. Referring to FIG. 1, laser L is irradiated to one surface of an object 10 to be processed to defined a hole 11.

However, the processing apparatus according to the above-described related art may have a problem below.

Since the hole 11 is defined by the laser L that generally goes straight, it is impossible to define the hole 11 in various shapes. That is, only the hole 11 having a longitudinal cross-section of a cylindrical shape may be defined, and the hole 11 having a longitudinal cross-section of various 3-dimensional shapes may not be defined.

SUMMARY OF THE INVENTION

To solve the above-described problem according to the related art, the present invention provides an apparatus for processing a micro-component by using laser, which is capable of micro-processing to have various cross-sectional shapes.

An embodiment of the present invention provides an apparatus for processing a micro-component by using laser, which defines a hole 11 by using laser L irradiated to a surface of an object 10 to be processed, the apparatus including: a laser irradiation part 100 irradiating the laser L; an optical axis horizontal movement part 300 horizontally moving an optical axis of the laser L irradiated from the laser irradiation part 100; an optical axis angle adjustment part 400 adjusting an angle of the optical axis of the laser L horizontally moved by the optical axis horizontal movement part 300; a reflection part 500 reflecting the laser L of which the angle of the optical axis is adjusted by the optical axis angle adjustment part 400; and a light collecting lens 600 collecting the laser L reflected by the reflection part 500 on the surface of the object 10 to be processed.

In an embodiment, the optical axis horizontal movement part 300 may include: a first optical member 310 rotating with respect to a rotational axis parallel to an incident direction of the laser L irradiated from the laser irradiation part 100 to horizontally move the optical axis of the laser L by a first horizontal movement distance D1 while the incident laser L irradiated from the laser irradiation part 100 passes to be projected at a projection angle θ1 that is the same as an incident angle θ1; and a second optical member 320 rotating with respect to a rotational axis parallel to an incident direction of the laser L irradiated from the laser irradiation part 100 to horizontally move an optical axis of the laser L by a second horizontal movement distance D2 while the incident laser L projected from the first optical member 310 passes to be projected at a projection angle θ2 that is the same as an incident angle θ2. Each of the first and second optical members 310, 320 may be maintained in thickness T1, T2 between an incident surface and an emission surface, and the incident surface and the emission surface may be inclined at the same angle with respect to an irradiation direction of the laser L irradiated from the laser irradiation part 100.

In an embodiment, the first and second optical members 310, 320 may use the laser that independently rotates in one direction or both directions with respect to the respective rotational axes, so that a phase difference and respective angular velocities at respective initial positions vary.

In an embodiment, first and second horizontal movement distances D1, D2 may be calculated based on following Equation 1 and Equation 2.

$$D1 = T1 \cdot \sin\theta 1 \left(1 - \frac{\cos\theta 1}{n1 \cdot \cos\theta 1}\right) \quad \text{[Equation 1]}$$

where, T1 is a thickness of the first optical member 310, θ1 is an angle of the laser incident into the first optical member 310, and n1 is a refractive index of the first optical member 310.

$$D2 = T2 \cdot \sin\theta 2 \left(1 - \frac{\cos\theta 2}{n2 \cdot \cos\theta 2}\right) \quad \text{[Equation 2]}$$

where, T2 is a thickness of the second optical member 320, θ2 is an angle of the laser incident into the second optical member 320, and n2 is a refractive index of the second optical member 320.

In an embodiment, coordinate axes crossing each other on a plane perpendicular to the direction of the laser L irradiated from the first and second optical members 310, 320 to the optical axis angle adjustment part 400 may be respectively defined as X and Y axes, and an X coordinate and a Y coordinate of a trace of the laser L incident into the optical axis angle adjustment part 400 after the optical axis is sequentially and horizontally moved by each of the first and second optical members 310, 320 are calculated based on Equation 3 below.

$$X = D1 \cdot \cos(\omega 1 \cdot t) + D2 \cdot \cos(\omega 2 \cdot t - \varphi)$$

$$Y = D1 \cdot \sin(\omega 1 \cdot t) + D2 \cdot \sin(\omega 2 \cdot t - \varphi) \quad \text{[Equation 3]}$$

where, D1 is a horizontal movement distance of the optical axis of the laser L by the first optical member 310, D2 is a horizontal movement distance of the optical axis of the laser L by the second optical member 320, ω1 is an angular velocity of the first optical member 310, ω2 is an angular velocity of the second optical member 320, Φ is a phase difference between the first and second optical members 310, 320 at respective initial positions thereof, and t is time.

In an embodiment, the optical axis angle adjustment part 400 may include: a first wedge prism 410 rotating with respect to a rotational axis parallel to an irradiation direction of the laser L irradiated from the laser irradiation part 100 to inclinedly project the incident laser L projected from the second optical member 320 at a predetermined angle, thereby adjusting the angle of the optical axis of the laser L; and a second wedge prism 420 rotating with respect to a rotational axis parallel to an irradiation direction of the laser L irradiated from the laser irradiation part 100 to inclinedly project the incident laser L projected from the first wedge prism 410 at a predetermined angle, thereby adjusting the angle of the optical axis of the laser L. Each of the first and second wedge prisms 410, 420 may have a thickness T3, T4 between the incident surface and the emission surface so that the thickness gradually increases from one end to the other end thereof and has an incident surface perpendicular to the irradiation direction of the laser L irradiated from the laser irradiation part 100.

In an embodiment, the first and second wedge prisms 410, 420 may use the laser independently rotating with respect to the rotational axes so that a phase difference and respective angular velocities at respective initial positions vary.

In an embodiment, in a spatial coordinate system in which coordinate axes crossing each other on a plane perpendicular to the optical axis of the laser L incident into the first wedge prism 410 are respectively defined as X and Y axes, and a coordinate axis perpendicular to the X and Y axes in a direction parallel to the optical axis of the laser L incident into the first wedge prism 410 is defined as a Z axis, while passing through the first and second wedge prisms 410, 420, a first adjustment angle A1 at which the optical axis of the laser is adjusted with respect to the Z axis on a X-Z plane and a second adjustment angle A2 at which the optical axis of the laser is adjusted with respect to the Z axis on a Y-Z plane may be calculated based on following Equation 4.

$$A1 = \alpha \cdot \cos(\omega 3 \cdot t) + \beta \cos(\omega 4 \cdot t - \sigma)$$

$$A2 = \alpha \cdot \sin(\omega 3 \cdot t) + \beta \sin(\omega 4 \cdot t - \sigma) \quad \text{[Equation 4]}$$

where, $\alpha$ is a refractive angle of the first wedge prism 410, $\beta$ is a refractive angle of the second wedge prism 420, $\omega 3$ is an angular velocity of the first wedge prism 410, $\omega 4$ is an angular velocity of the second wedge prism 420, $\sigma$ is an initial phase difference between the first and second wedge prisms 410, 420, and t is time.

BRIEF DESCRIPTION OF THE FIGURES

FIG. 1 is a conceptual cross-sectional view illustrating a process of defining a hole by an apparatus for processing a micro-component by using laser according to a related art.

FIG. 2 is a configuration view illustrating an apparatus for processing a micro-component by using laser according to a first embodiment of the present invention.

FIG. 3 is a conceptual view illustrating a shape in which laser of which a focal length is adjusted by a focal length adjustment part is irradiated to an object to be processed according to the first embodiment of the present invention.

FIG. 4 is a conceptual view illustrating a shape in which the laser that horizontally moves or/and is angle-adjusted by an optical axis horizontal movement part and an optical axis angle adjustment part is irradiated to the object to be processed according to the first embodiment of the present invention.

FIG. 5 is a cut-away perspective view illustrating an exemplary shape in which the object to be processed is processed according to the first embodiment of the present invention.

FIG. 6 is a conceptual cross-sectional view illustrating a main portion of an apparatus for processing a micro-component by using laser according to a second embodiment of the present invention.

DETAILED DESCRIPTION OF THE INVENTION

Hereinafter, an apparatus for processing a micro-component by using laser according to an embodiment of the present invention will be described in more detail with reference to the accompanying drawings.

FIG. 2 is a configuration view of the apparatus for processing a micro-component by using laser according to a first embodiment of the present invention, FIG. 3 is a conceptual view illustrating a shape in which the laser having a focal length adjusted by a focal length adjustment part according to the first embodiment of the present invention is irradiated to an object to be processed (hereinafter referred to as a processed object), FIG. 4 is a conceptual view illustrating a shape in which the laser that horizontally moves or/and is angle-adjusted by an optical axis horizontal movement part and an optical axis angle adjustment part is irradiated to the processed object according to the first embodiment of the present invention, and FIG. 5 is a partially cut-away perspective view illustrating an exemplary shape in which the processed object is processed according to the first embodiment of the present invention.

Firstly, referring to FIG. 2, an apparatus 1 for processing a micro-component by using laser according to an embodiment includes a laser irradiation part 100, a focal length adjustment part 200, an optical axis horizontal movement part 300, an optical axis angle adjustment part 400, a reflection part 500, and a light collecting lens 600. The laser irradiation part 100 irradiates laser L for defining a hole 11 in an processed object 10. Also, the focal length adjustment part 200 adjusts a focal length of the laser L irradiated from the laser irradiation part 100. The optical axis horizontal movement part 300 and the optical axis angle adjustment part 400 horizontally move an irradiation direction or adjust an irradiation angle of the laser L irradiated from the laser irradiation part 100. The reflection part 500 reflects the laser L having the irradiation direction or/and the irradiation angle adjusted by the optical axis horizontal movement part 300 and the optical axis angle adjustment part 400 toward the light collecting lens 600. Also, the light collecting lens 600 collects the laser L reflected by the reflection part 500 to the processed object 10.

In more detail, the focal length adjustment part 200 includes a concave lens 210 and a convex lens 220. Each of the concave lens 210 and the convex lens 220 is installed to be able to move in the irradiation direction of the laser L from the laser irradiation part 100. Also, as the laser L is diffused or collected according to a distance between the concave lens 210 and the convex lens 220, the final focal length of the laser L is adjusted.

Also, the optical axis horizontal movement part 300 includes first and second optical members 310 and 320. The first and second optical members 310 and 320 horizontally and sequentially move the optical axis of the laser L having the focal length adjusted by the focal length adjustment part 200 to transmit the laser L to the optical axis angle adjustment part 400. Substantially, each of the first and second optical members 310 and 320 may have a polyhedral shape in which an incident surface through which the laser L is incident and an emission surface through which the laser L projects are parallel to each other so that each of incident angles θ1 and θ2 and each of project angles θ1 and θ2 are the same as each other. In other words, each of the first and second optical members 310 and 320 maintain a constant thickness T1, T2 between the incident surface and the emission surface. Here, each of the first and second optical members 310 and 320 is inclined to have the incident surfaces and the emission surfaces, which are inclined at a predetermined angle with respect to the incident direction of the laser L irradiated from the laser irradiation part 100. Also, the first and second optical members 310 and 320 are spaced apart from each other in the irradiation direction of the laser L irradiated from the laser irradiation part 100 so that the first optical member 310 is disposed relatively closer to the optical length adjustment part 200 than the second optical member 320.

Accordingly, the optical axis of the laser L incident into the first and second optical members 310 and 320 horizontally moves while sequentially passing through the first and second optical members 310 and 320. A first horizontal movement distance D1 between the optical axes of the laser L incident into the first optical member 310 and the laser L projecting from the first optical member 310 and a second horizontal movement distance D2 between the optical axes of the laser L incident into the second optical member 310 and the laser L projecting from the second optical member 310 are respectively calculated by Mathematical formula 1 and Mathematical formula 2 below.

$$D1 = T1 \cdot \sin\theta1 \left(1 - \frac{\cos\theta1}{n1 \cdot \cos\theta1}\right) \quad \text{[Mathematical formula 1]}$$

where, T1 is a thickness of the first optical member 310, θ1 is an angle of the laser incident into the first optical member 310, and n1 is a refractive index of the first optical member 310.

$$D2 = T2 \cdot \sin\theta2 \left(1 - \frac{\cos\theta2}{n2 \cdot \cos\theta2}\right) \quad \text{[Mathematical formula 2]}$$

where, T2 is a thickness of the second optical member 320, θ2 is an angle of the laser incident into the second optical member 320, and n2 is a refractive index of the second optical member 320.

Also, the first and second optical members 310 and 320 are installed to be rotatable with respect to respective rotational axes parallel to the progress direction of the laser L. Here, the first and second optical members 310 and 320 independently rotate in one direction or both directions so that the laser L irradiated to the optical axis angle adjustment part 400 forms various shaped traces. Here, coordinate axes crossing each other on a plane perpendicular to a direction of the laser L irradiated from the first and second optical members 310 and 320 to the optical axis angle adjustment part 400 may be respectively defined as X and Y axes, and a X-coordinate and a Y-coordinate of the trace of the laser L incident into the optical axis angle adjustment part 400 after the optical axis is sequentially horizontally moves by the first and second optical members 310 and 320 may be calculated by Mathematical formula 3 below.

$$X = D1 \cdot \cos(\omega1 \cdot t) + D2 \cdot \cos(\omega2 \cdot t - \varphi)$$

$$Y = D1 \cdot \sin(\omega1 \cdot t) + D2 \cdot \sin(\omega2 \cdot t - \varphi) \quad \text{[Mathematical formula 3]}$$

where, D1 is a horizontal movement distance of the optical axis of the laser L by the first optical member 310, D2 is a horizontal movement distance of the optical axis of the laser L by the second optical member 310, ω1 is an angular velocity of the first optical member 310, ω2 is an angular velocity of the second optical member 320, and Φ is a phase difference between the first and second optical members 310 and 320 at respective initial positions thereof.

Accordingly, as the horizontal movement distances D1 and D2 of the optical axis of the laser L by the first and second optical members 310 and 320, the angular velocities ω1 and ω2 of the first and second optical members 310 and 320, and the phase difference Φ between the first and second optical members 310 and 320 at the respective initial positions are adjusted, the trace in which the laser L having the optical axis horizontally moves while passing through the first and second optical members 310 and 320 t is irradiated to the optical axis angle adjustment part 400 may have various shapes.

Also, the optical axis angle adjustment part 400 includes first and second wedge prisms 410 and 420. The first and second wedge prisms 410 and 420 adjust an angle of the optical axis of the laser L horizontally moved by the optical horizontal movement part 300 to transmit the laser to the reflection part 500. The first and second wedge prisms 410 and 420 respectively have thicknesses T3 and T4, each of which gradually increases from one end to the other end thereof, between the incident surfaces and the emission surfaces thereof. Also, the first and second wedge prisms 410 and 420 are spaced apart from each other in the irradiation direction of the laser L irradiated from the laser irradiation part 100 so that the first wedge prism 410 is disposed relatively closer to the optical axis horizontal movement part 300 than the second wedge prism 420. Here, each of the incident surfaces of the first and second wedge prisms 410 and 420 is perpendicular to the irradiation direction of the laser L. Accordingly, the laser L incident into the first and second wedge prisms 410 and 420 has an irradiation angle inclined toward a thick portion, which has relatively great thickness, of the first and second wedge prisms 410 and 420.

In a spatial coordinate system in which coordinate axes crossing each other on a plane perpendicular to the optical axis of the laser L incident into the first wedge prism 410 are respectively defined as X and Y axes, and a coordinate axis perpendicular to the X and Y axes in a direction parallel to the optical axis of the laser L incident into the first wedge prism 410 is defined as a Z axis, while passing through the first and second wedge prisms 410 and 420, each of a first adjustment angle A1 at which the optical axis of the laser is adjusted with respect to the Z axis on a X-Z plane and a second adjustment angle A2 at which the optical axis of the laser is adjusted with respect to the Z axis on a Y-Z plane is calculated on the basis of Mathematical formula 4.

$$A1 = \alpha \cdot \cos(\omega3 \cdot t) + \beta \cos(\omega4 \cdot t - \sigma)$$

$$A2 = \alpha \cdot \sin(\omega3 \cdot t) + \beta \sin(\omega4 \cdot t - \sigma) \quad \text{[Mathematical formula 4]}$$

where, α is a refractive angle of the first wedge prism 410, β is a refractive angle of the second wedge prism 420, ω3 is an angular velocity of the first wedge prism 410, ω4 is an angular velocity of the second wedge prism 420, σ is an initial phase difference of the first and second wedge prisms 410 and 420, and t is time.

Meanwhile, the reflection part 500 reflects, e.g., the laser L having an angle adjusted by the optical axis angle adjustment part 400 to transmit the laser L to the light collecting lens 600. For example, as the reflection part 500, a mirror coated with a dielectric thin film or metal reflecting relatively broadband wavelength may be used to reflect only a wavelength band of the laser L.

Also, the light collecting lens 600 collects the laser L reflected by the reflection unit 500 to a surface of the processed object 10. Substantially, the light collecting lens 600 collects the laser L, of which the focal length is adjusted by the focal length adjustment part 200, and then the irradiation direction is horizontally moved and the irradiation angle is adjusted by the optical axis horizontal movement part 300 and the optical axis angle adjustment part 400, to the surface of the processed object 10.

In more detail, referring to FIG. 3, with reference to FIG. 3A, FIG. 3B illustrates a state in which the focal length of the laser L relatively decreases by the focal length adjustment part 200, and FIG. 3C illustrates a state in which the focal length of the laser L relatively increases by the focal length adjustment part 200. For example, at the beginning of defining a hole in the surface of the processed object 10, as illustrated in FIG. 3B, when the focal length adjustment part 200 decreases the focal length to collect the laser L on the surface of the processed object 10, and a depth of the hole defined in the surface of the processed object 10 increases, as illustrated in FIGS. 3A and 3C, the focal length adjustment part 200 may relatively increase the focal length of the laser L.

Also, referring to FIG. 4, FIG. 4A illustrates a state in which the laser L having the irradiation direction horizontally moved by the optical axis horizontal movement part 300 is collected on the surface of the processed object 10. Also, FIG. 4B illustrates a state in which the laser L having the irradiation direction horizontally moved by the optical axis horizontal movement part 400 is collected on the surface of the processed object 10. Also, FIG. 4C illustrates a state in which the laser L of which the irradiation direction is horizontally moved by the optical axis horizontal movement part 300, and then the irradiation angle is adjusted by the optical axis adjustment part 400 is collected on the surface of the processed object 10 by the light collecting lens 600.

That is, referring to FIGS. 3 and 4, according to the adjustment of the focal length, the horizontal movement of the irradiation direction, and the irradiation angle of the laser L by the focal length adjustment part 200, the optical axis horizontal movement part 300, and the optical axis angle adjustment part 400, the trace of the laser L collected by the light collecting lens 600 and irradiated to the surface of the processed object 10 may be variously provided. In particular, as the X-coordinate and the Y-coordinate of the optical axis of the laser L on the X-axis and the Y-axis are adjusted according to the horizontal movement of the optical axis of the laser L by the rotation of the first and second optical members 310 and 320, and the angle of the optical axis of the laser L on a X-Y plane and a Y-Z plane is adjusted according to the adjustment of the angle of the optical axis of the laser L by the rotation of the first and second wedge prisms 410 and 420, as illustrated in FIG. 5, various 3-dimensional shapes may be processed by the laser L irradiated to the surface of the processed object 10.

Hereinafter, an apparatus for processing a micro-component by using laser according to a second embodiment of the present invention will be described in more detail with reference to the accompanying drawings.

FIG. 6 is a cross-sectional view illustrating a main portion of the apparatus for processing a micro-component by using laser according to the second embodiment of the present invention. Like reference numerals according to the first embodiment of the present invention denote like elements in FIGS. 2 to 5, and a description of the same components as those of the first embodiment will be omitted.

Referring to FIG. 6, the apparatus 2 for processing a micro-component according to an embodiment further includes a gas supply part 700 and a guide part 800. The gas supply part 700 supplies gas, e.g., inert gas, for preventing the processed object 10 from being oxidized in a process of processing the processed object 10 by the laser L Also, the guide part 800 serves to guide the gas supplied from the gas supply part 700 toward the surface of the processed object 10 processed by the laser L.

In the apparatus for processing a micro-component by using laser according to the embodiment of present invention, the laser, of which the optical axis horizontally moves to form the preset trace while passing through the first and second optical members rotating with respect to the respective rotational axes parallel to each other, passes through the first and second wedge prisms rotating with respect to respective rotational axes parallel to each other and then passes through the collecting lens after the angle of the optical axis is adjusted to form the preset trace, thereby being collected on the surface of the object to be processed in various traces and angles. Thus, according to the embodiment of the present invention, as the trace of the laser collected on the surface of the object to be processed varies on the basis of the horizontal movement and the angle adjustment of the optical axis of the laser, the hole having the variously shaped longitudinal cross-section and transverse cross-section may be defined.

It should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. An apparatus for processing a micro-component by using laser, which defines a hole (11) by using laser (L) irradiated to a surface of an object (10) to be processed, the apparatus comprising:
   a laser irradiation part (100) irradiating the laser (L);
   an optical axis horizontal movement part (300) horizontally moving an optical axis of the laser (L) irradiated from the laser irradiation part (100);
   an optical axis angle adjustment part (400) adjusting an angle of the optical axis of the laser (L) horizontally moved by the optical axis horizontal movement part (300);
   a reflection part (500) reflecting the laser (L) of which the angle of the optical axis is adjusted by the optical axis angle adjustment part (400); and
   a light collecting lens (600) collecting the laser (L) reflected by the reflection part (500) on the surface of the object (10) to be processed.

2. The apparatus of claim 1, wherein the optical axis horizontal movement part (300) comprises:
   a first optical member (310) rotating with respect to a rotational axis parallel to an irradiation direction of the laser (L) irradiated from the laser irradiation part (100) to horizontally move the optical axis of the laser (L) by a first horizontal movement distance (D1) while the incident laser (L) irradiated from the laser irradiation part (100) passes to be projected at a projection angle (θ1) that is the same as an incident angle (θ1); and a second optical member (320) rotating with respect to a rotational axis parallel to the irradiation direction of the laser (L) irradiated from the laser irradiation part (100) to horizontally move the optical axis of the laser (L) by a second horizontal movement distance (D2) while the incident laser (L) projected from the first optical member (310) passes to be projected at a projection angle (θ2) that is the same as an incident angle (θ2), wherein each of the first and second optical members (310, 320) are maintained in thickness (T1, T2) between an incident surface and an emission surface, and the incident surface and the emission surface are inclined at the same angle with respect to the irradiation direction of the laser (L) irradiated from the laser irradiation part (100).

3. The apparatus of claim 2, wherein the first and second optical members (310, 320) use the laser that independently rotates in one direction or both directions with respect to the respective rotational axes, so that a phase difference and respective angular velocities at respective initial positions vary.

4. The apparatus of claim 2, wherein first and second horizontal movement distances (D1, D2) are calculated based on following [Equation 1] and [Equation 2]

$$D1 = T1 \cdot \sin\theta1 \left(1 - \frac{\cos\theta1}{n1 \cdot \cos\theta1}\right) \qquad \text{[Equation 1]}$$

where, T1 is a thickness of the first optical member (310), θ1 is an angle of the laser incident into the first optical member (310), and n1 is a refractive index of the first optical member (310)

$$D2 = T2 \cdot \sin\theta2 \left(1 - \frac{\cos\theta2}{n2 \cdot \cos\theta2}\right) \qquad \text{[Equation 2]}$$

where, T2 is a thickness of the second optical member (320), θ2 is an angle of the laser incident into the second optical member (320), and n2 is a refractive index of the second optical member (320).

5. The apparatus of claim 2, wherein coordinate axes crossing each other on a plane perpendicular to the direction of the laser (L) irradiated from the first and second optical members (310, 320) to the optical axis angle adjustment part (400) are respectively defined as X and Y axes, and an X coordinate and a Y coordinate of a trace of the laser (L) incident into the optical axis angle adjustment part (400) after the optical axis is sequentially and horizontally moved by each of the first and second optical members (310, 320) are calculated based on [Equation 3] below $$X = D1 \cdot \cos(\omega1 \cdot t) + D2 \cdot \cos(\omega2 \cdot t - \varphi)$$

$$Y = D1 \cdot \sin(\omega1 \cdot t) + D2 \cdot \sin(\omega2 \cdot t - \varphi) \qquad \text{[Equation 3]}$$

where, D1 is a horizontal movement distance of the optical axis of the laser (L) by the first optical member (310), D2 is a horizontal movement distance of the optical axis of the laser (L) by the second optical member (320), ω1 is an angular velocity of the first optical member (310), ω2 is an angular velocity of the second optical member (320), Φ is a phase difference between the first and second optical members (310, 320) at respective initial positions thereof, and t is time.

6. The apparatus of claim 2, wherein the optical axis angle adjustment part (400) comprises:

a first wedge prism (410) rotating with respect to a rotational axis parallel to the irradiation direction of the laser (L) irradiated from the laser irradiation part (100) to inclinedly project the incident laser (L) projected from the second optical member (320) at a predetermined angle, thereby adjusting the angle of the optical axis of the laser (L); and a second wedge prism (420) rotating with respect to a rotational axis parallel to the irradiation direction of the laser (L) irradiated from the laser irradiation part (100) to inclinedly project the incident laser (L) projected from the first wedge prism (410) at a predetermined angle, thereby adjusting the angle of the optical axis of the laser (L), wherein each of the first and second wedge prisms (410, 420) has a thickness (T3, T4) between the incident surface and the emission surface so that the thickness gradually increases from one end to the other end thereof and has an incident surface perpendicular to the irradiation direction of the laser (L) irradiated from the laser irradiation part (100).

7. The apparatus of claim 6, wherein the first and second wedge prisms (410, 420) use the laser independently rotating with respect to the respective rotational axes so that a phase difference and respective angular velocities at respective initial positions vary.

8. The apparatus of claim 6, wherein in a spatial coordinate system in which coordinate axes crossing each other on a plane perpendicular to the optical axis of the laser (L) incident into the first wedge prism (410) are respectively defined as X and Y axes, and a coordinate axis perpendicular to the X and Y axes in a direction parallel to the optical axis of the laser (L) incident into the first wedge prism (410) is defined as a Z axis, while passing through the first and second wedge prisms (410, 420), a first adjustment angle (A1) at which the optical axis of the laser is adjusted with respect to the Z axis on a X-Z plane and a second adjustment angle (A2) at which the optical axis of the laser is adjusted with respect to the Z axis on a Y-Z plane are calculated based on following [Equation 4]

$$A1 = \alpha \cdot \cos(\omega3 \cdot t) + \beta \cos(\omega4 \cdot t - \sigma)$$

$$A2 = \alpha \cdot \sin(\omega3 \cdot t) + \beta \sin(\omega4 \cdot t - \sigma) \qquad \text{[Equation 4]}$$

where, α is a refractive angle of the first wedge prism (410), β is a refractive angle of the second wedge prism (420), ω3 is an angular velocity of the first wedge prism (410), ω4 is an angular velocity of the second wedge prism (420), σ is an initial phase difference between the first and second wedge prisms (410, 420), and t is time.

* * * * *